Aug. 7, 1945.   B. F. MULDOON   2,381,510
PORTABLE FLASHLIGHT
Original Filed Feb. 8, 1941
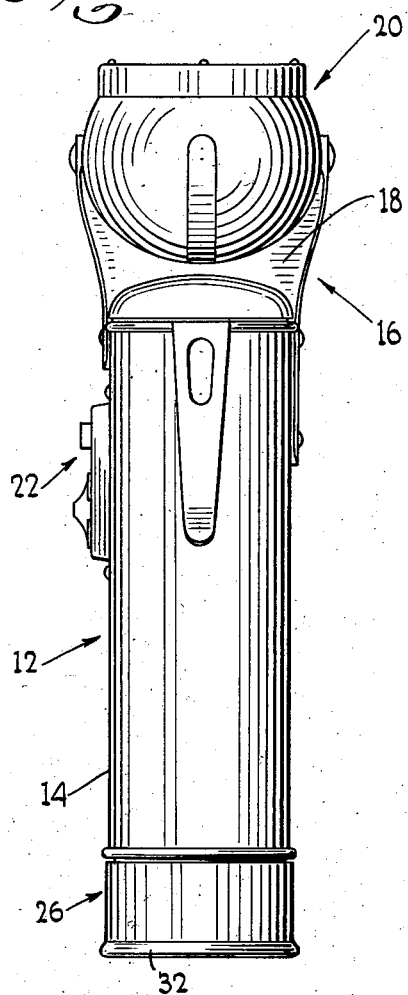
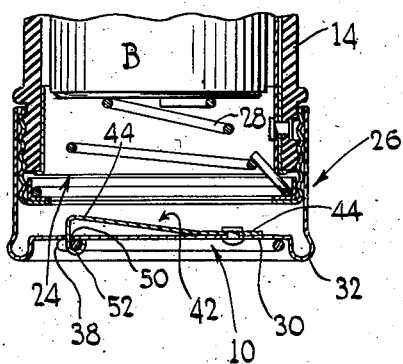
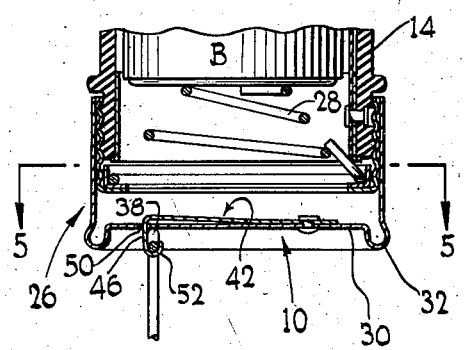
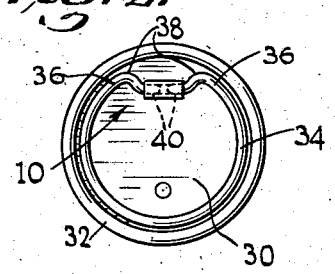
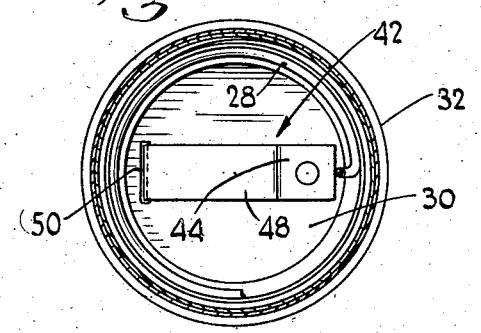
INVENTOR
BERNARD FRANCIS MULDOON
BY
ATTORNEY Patented Aug. 7, 1945

2,381,510

UNITED STATES PATENT OFFICE 2,381,510

PORTABLE FLASHLIGHT

Bernard Francis Muldoon, Caldwell, N. J., assignor to Henry Hyman, Brooklyn, N. Y.

Original application February 8, 1941, Serial No. 377,983. Divided and this application February 9, 1943, Serial No. 475,256

4 Claims. (Cl. 240—10.6)

This invention relates to portable flashlights. More particularly, it is directed to a novel suspension member and mounting shaft.

The main object of the invention is to provide a suspension member for a flashlight which is mounted for rotary movement on a flashlight casing wall in such manner that it can be swung to project perpendicularly therefrom and which is retractably biased towards a position in which it lies flat against the casing wall.

More specifically, it is an object of the invention to provide a suspension member which shall be automatically maintained in either a projecting operative position or a retracted inoperative position, and upon being rotated a few degrees in one direction away from its perpendicular projecting position will snap back to fully retracted position and upon being rotated a few degrees in the opposite direction away from such perpendicular projecting position will snap back to an operative projecting position other than said perpendicular projecting position.

A further object of the invention is to provide a suspension member of the character described having the foregoing advantageous features and particularly adapted to be mounted upon an exterior casing surface such as the rear cap of a flashlight.

Another object of the invention is to provide an extensible suspension member which shall operate in an extremely easy and efficient manner, comprises but few and simple parts, and be comparatively inexpensive to manufacture and rugged and durable to a high degree.

Other objects of the invention will in part be obvious and in part hereinafter pointed out.

The invention accordingly consists in the features of construction, combinations of elements, and arrangement of parts which will be exemplified in the construction hereinafter described, and of which the scope of application will be indicated in the appended claims.

This application is a division of my copending parent application for Portable electric flashlights, Serial No. 377,983, filed February 8, 1941.

In the accompanying drawing, in which is shown one of the various possible embodiments of the invention, Fig. 1 is a side elevational view of a flashlight provided with a suspension member and mounting therefor embodying the invention, Fig. 2 is a bottom view thereof, Fig. 3 is a fragmentary enlarged sectional view of the bottom assembly showing the suspension member in fully retracted position, Fig. 4 is a similar view with the suspension member in extended position, and Fig. 5 is a sectional view taken along the line 5—5 of Fig. 4.

In general, I carry out the invention by mounting a suspension member on a flashlight casing in such manner that the same may be rotated relative to the casing from a position adjacent a wall of the casing through a position in which the suspension member projects perpendicularly therefrom. I also provide means to urge the suspension member back to retracted position from any but its perpendicular projecting position. When the suspension member is to one side of such perpendicular projecting position, it will turn freely back to fully retracted position; but when it is disposed to the other side of such perpendicular projecting position, its movement toward fully retracted position is arrested so that the support is maintained in an operative projecting position other than said perpendicular projecting position.

Referring now to the accompanying drawing, I have there disclosed a suspension member 10 embodying the invention on a flashlight 12 such as is illustrated and described in my aforesaid copending parent application. The flashlight comprises a battery casing 14 and a top assembly 16, including a stationary bracket 18 on which a head 20 is rotatably mounted. The batteries B are housed in the casing 14 and are connected to an electric lamp (not shown) inside of the head by an electric circuit which includes a hand switch 22. The batteries are, as usual, inserted in the casing through the open rear end 24 and are held therein by a threaded cap 26 which presses a spring 28 against the base of the lowermost battery B. The cap includes a rear flat metallic wall 30 which forms the bottom of the flashlight. Said wall is bounded, as is customary in this art, by a hollow integral bead 32.

The suspension member 10 is illustrated as being mounted upon this rear wall 30 and adapted to be received, when fully retracted, within the recess defined by the bead 32 and said wall. It will, however, be apparent as the description proceeds that this location of the suspension member, although desirable for the type of suspension member shown, is not essential, and that the suspension member may be mounted upon any other suitable portion of the flashlight and may, without departing from the spirit of my invention, be received either in a concealing recess or not, depending upon the use to which the flashlight is to be put and upon the design thereof.

The illustrated suspension member is of the type known as a ring hanger and includes a major circular segment of wire 34 which lies, when in closed or retracted position, against the rear wall 30 and next to the bead 32. The ends 36 of the segment are bent inwardly for a short distance to provide sliding bearing portions 38 on the wire segment 34 and are then straightened into alignment to form pivoting journal portions 40. The bearing portions, it will be seen, lie to one side of a line joining the journals 40 while the major portion of the wire segment lies on the opposite side of said line. Said journal portions are supported for rotation relative to and for translation towards and away from the rear wall 30 by a flat spring 42 riveted at one end 44 to the interior surface of the wall 30 and having a leg 46 angularly disposed with respect to the body portion 48 of said spring. The leg 46 freely passes through a slot 50 in the rear wall 30 and is provided at its free end with a crook or bearing 52 in which the journal portions 40 of the wire segment are rotatably received. The body portion 48 of the spring, prior to assembly, is bent at a slight angle to the riveted end 44 so as to constantly urge the crook 52 and thus the journal portions 40 towards the rear wall 30.

When it is desired to employ the suspension member 10, as for example when the flashlight 12 is to be hung from a hook, the user inserts a fingernail between the wire segment 34 and the bead 32 and slightly raises said segment. The segment is then rotated 90° away from the base to its perpendicular projecting or dead center position shown in Fig. 4. If it is desired to leave the segment in an operative projecting position, it can be rotated a few degrees further in the same direction, whereupon the spring 42 will urge the journal portions 40 of the segment toward the rear wall 30 causing the segment 34 to continue to rotate until portions thereof abut the bead 32. Since the bead is raised, the segment, when stopped thereby, will still be in a substantially extended position wherein it may be readily grasped and the flashlight manipulated or hung thereby. It will be appreciated that the spring 42 is not strong enough to retractively bias the wire segment when the weight of the flashlight 12 depends therefrom.

If it is desired to fully retract the segment 34 it is merely necessary to rotate said segment partially towards closing position so as to move the sliding bearings 38 slightly to the left of the dead center position (Fig. 4). The spring 42 will then urge the journal portions 40 towards the wall 30 and cause the segment to pivot about the journals 40 thus automatically snapping the segment back to closed position (Figs. 2 and 3).

It will be understood that the circular segment need not be in the form of a bail or arched handle, as illustrated, but may assume other shapes such, for example, as an open hook, a closed loop, or a straight handle, without departing from the spirit of my invention.

It will thus be seen that there is provided a device in which the several objects of the invention are achieved, and which is well adapted to meet the conditions of practical use.

As various possible embodiments might be made of the above invention, and as various changes might be made in the embodiment above set forth, it is to be understood that all matter herein set forth or shown in the accompanying drawing is to be interpreted as illustrative and not in a limiting sense.

Having thus described my invention, I claim as new and desire to secure by Letters Patent:

1. For use with a flashlight having a wall, a suspension member for the flashlight, said member having a journal about which it is rotatable and portions lying to both sides of the axis of revolution of said journal, a bearing in which said journal is rotatable, means attached to said wall at one side thereof and supporting said bearing at the other side thereof for movement of said bearing towards and away from said wall, said means being resilient to bias the bearing towards said wall, one of the portions of said suspension member which is located at one side of said journal being so proportioned as to slidably bear against said wall.

2. For use with a flashlight having a wall, a suspension member for the flashlight, said member having a journal about which it is rotatable and portions lying to both sides of the axis of revolution of said journal, a leaf spring carried by said wall and having a crook at its free end in which the journal is received to rotatably support the same and bias it towards said wall, one of the portions of said suspension member which lies to one side of said journal slidably bearing against said wall.

3. For use with a flashlight having a wall, a suspension member for the flashlight, said member comprising a bail, the two ends of which are turned inwardly to provide spaced portions which slidably bear against the wall and then bent into alignment to provide journals, a pair of bearings in which said journals are rotatable, means to support said bearings for movement towards and away from said wall, and means to resiliently bias the same towards said wall.

4. A ring hanger for the rear cap of a flashlight having a bottom wall, said hanger comprising a bail, the two ends of which are turned inwardly to provide sliding bearing portions and then bent into alignment to provide journals, a leaf spring disposed internally of said cap and having an angled portion passing freely through an aperture in said bottom wall, said leaf spring being rigidly supported at a portion spaced from said angled portion internally of said cap, the end of said angled portion which extends through said bottom wall having a crook thereon in which said journals are pivotally received, the portion of said leaf spring intermediate said angled portion and the portion which is attached to said bottom wall sloping away from said bottom wall so as to resiliently bias said journals toward said bottom wall.

BERNARD FRANCIS MULDOON.